United States Patent
Kim et al.

(10) Patent No.: US 10,320,186 B2
(45) Date of Patent: Jun. 11, 2019

(54) DISPLAY DRIVE CHIP

(71) Applicant: SAMSUNG ELECTRONICS CO., LTD., Suwon-si, Gyeonggi-Do (KR)

(72) Inventors: Hyoun-Soo Kim, Seoul (KR); Myoung-Soo Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 399 days.

(21) Appl. No.: 15/361,055

(22) Filed: Nov. 24, 2016

(65) Prior Publication Data

US 2017/0155245 A1    Jun. 1, 2017

(30) Foreign Application Priority Data

Nov. 27, 2015   (KR) .................. 10-2015-0167507

(51) Int. Cl.
*G09G 5/00* (2006.01)
*H02H 9/04* (2006.01)
*G09G 3/20* (2006.01)

(52) U.S. Cl.
CPC .......... *H02H 9/046* (2013.01); *G09G 3/2092* (2013.01); *H02H 9/044* (2013.01); *G09G 2330/04* (2013.01)

(58) Field of Classification Search
CPC .. G09G 2330/04; G09G 3/2092; H02H 9/044; H02H 9/046
See application file for complete search history.

(56) References Cited

U.S. PATENT DOCUMENTS

| | | |
|---|---|---|
| 4,914,503 A | 4/1990 | Shirato et al. |
| 6,410,936 B1 | 6/2002 | Hongo |
| 7,400,028 B2 | 7/2008 | Tomita |
| 7,566,589 B2 | 7/2009 | Lee et al. |
| 7,812,424 B2 | 10/2010 | Barth et al. |
| 8,330,253 B2 | 12/2012 | Tomita |
| 8,921,982 B2 | 12/2014 | Tomita |
| 9,012,297 B2 | 4/2015 | Barth et al. |
| 9,105,630 B2 | 4/2015 | Lee |
| 2009/0034353 A1 | 2/2009 | Narui et al. |

(Continued)

FOREIGN PATENT DOCUMENTS

| | | |
|---|---|---|
| JP | 2006-100863 A | 4/2006 |
| JP | 2009-206402 A | 9/2009 |

OTHER PUBLICATIONS

US 8,227,900 B2, 07/2012, Tomita (withdrawn)

*Primary Examiner* — Insa Sadio
(74) *Attorney, Agent, or Firm* — Volentine, Whitt & Francos, PLLC

(57) ABSTRACT

A display drive chip includes an electrostatic discharge (ESD) protection circuit unit configured to protect a circuit from ESD, an output including output pins for ouputting an output signal from a circuit disposed in an electric circuit region located in a central part of the display drive chip, a main voltage metal line electrically connecting the ESD protection circuit unit and the output to each other in the electric circuit region, an auxiliary voltage metal line that is connected to the ESD protection circuit unit and is disposed in a region of the chip outside the perimeter of the electric circuit region, and connection metal lines electrically connect the auxiliary voltage metal line and the output pins to each other.

20 Claims, 16 Drawing Sheets

(56) References Cited

U.S. PATENT DOCUMENTS

2013/0182356 A1* 7/2013 Yang .................. H02H 9/046
361/56
2016/0210895 A1* 7/2016 Fan .................... G09G 3/3208

* cited by examiner

DISPLAY DRIVE CHIP

PRIORITY STATEMENT

This application claims the benefit of Korean Patent Application No. 10-2015-0167507, filed on Nov. 27, 2015, in the Korean Intellectual Property Office, the disclosure of which is hereby incorporated by reference in its entirety.

BACKGROUND

The inventive concept relates to electronic devices having displays and to chips for driving electronic displays. More particularly, the inventive concept relates to a display drive chip that includes circuitry to prevent an electrostatic discharge (ESD) from damaging the chip.

Electrostatic discharge (ESD) is a momentary discharge of electricity between two objects charged with different potentials that may occur when the objects are close to each other or come in contact with each other. In certain electronic devices, ESD may easily occur at a voltage of several kilovolts (kV) to tens of kV. In the case of semiconductor devices, damage due to ESD has become more problematic as the size of semiconductor devices have decreased especially from the micro-scale to the nano-scale.

SUMMARY

According to an aspect of the inventive concept, there is provided a display drive chip including an electrostatic discharge (ESD) protection circuit unit comprising an ESD protection circuit, an integrated circuit disposed in an electric circuit region located in a central part of the display drive chip, an output comprising output pins at which signals from the integrated circuit are output, a main voltage metal line electrically connecting the ESD protection circuit and the output pins to each other in the electric circuit region such that the output pins are electrically connected to the ESD protection circuit, at least one auxiliary voltage metal line that is electrically connected to the ESD protection circuit and disposed in a region of the display drive chip outside the perimeter of the electric circuit region, and connection metal lines electrically connecting the at least one auxiliary voltage metal line and the output pins to each other.

According to another aspect of the inventive concept, there is provided a display drive chip including an electrostatic discharge (ESD) protection circuit unit comprising an ESD protection circuit, a main voltage metal line that is electrically connected to the ESD protection circuit in an electric circuit region located in a central part of the display drive chip, at least one auxiliary voltage metal line electrically connected to the ESD protection circuit unit and disposed in a region extending around the perimeter of the electric circuit region, and connection metal lines electrically connecting the auxiliary voltage metal line and the main voltage metal line to each other.

According to another aspect of the inventive concept, there is provided a display drive chip including a body having a central electric circuit region and a peripheral region extending around the perimeter of the central electric circuit region, a display driver integrated circuit (DDI) confined to the central electric circuit region of the body of the chip, electrostatic discharge (ESD) circuitry comprising an ESD protection circuit disposed in the central electric circuit region of the body of the chip, a main voltage metal line that is electrically connected to the ESD protection circuit in the central electric circuit region, and to the display driver circuit (DDI), at least one auxiliary voltage metal line that is confined to the peripheral region of the body of the chip and is electrically connected to the ESD protection circuit, and a series of connection metal lines running between and electrically connecting the main voltage metal line and the at least one auxiliary voltage metal line to each other.

BRIEF DESCRIPTION OF THE DRAWINGS

The inventive concept will be more clearly understood from the following detailed description of examples thereof taken in conjunction with the accompanying drawings in which.

DETAILED DESCRIPTION

Figure 1A:
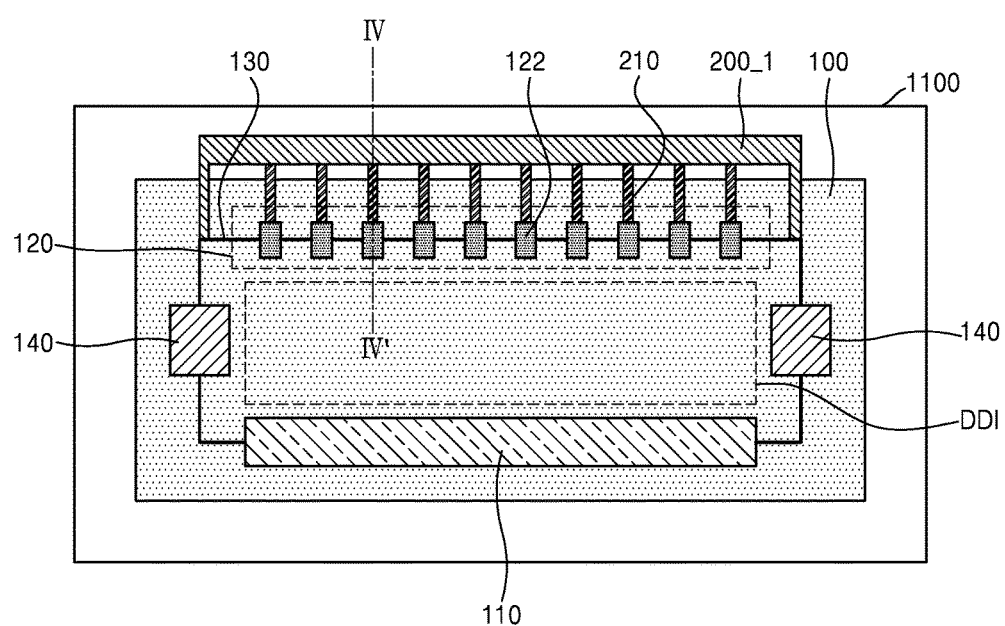
FIG. 1A is a plan view of a display drive chip according to examples of the inventive concept.

The inventive concept will now be described in detail with reference to the accompanying drawings. Note, like reference numerals designate like elements throughout the drawings.

Referring to FIG. 1A, a display drive chip 1100 according to an example of the inventive concept may include an electrostatic discharge (ESD) protection circuit unit 140, an output 120, a main voltage metal line 130, an auxiliary voltage metal line 200, and a connection metal line 210.

The display drive chip 1100 may further include at least one display driver integrated circuit (DDI), a plurality of metal wires, and a passivation layer that covers the at least one DDI and the plurality of metal wires. The display drive chip 1100 may have a chip body in the shape of a quadrangle as viewed in plan, i.e., a quadrangular footprint, including two long sides (a first long side and a second long side) and two short sides (a first short side and a second short side).

The DDI is disposed in an electric circuit region 100 and may generate driving signals for driving pixels of a display panel. The DDI may include thin film transistors (TFT) formed by conventional semiconductor manufacturing processes.

The passivation layer may protect the DDI and the metal wires from physical damage and/or electric damage. The passivation layer may include an insulation material. Examples of the insulation material include silica, silicon nitride (SiNx), and insulating resin. However, the insulation material of the passivation layer is not limited to any of these materials.

In an example of the inventive concept, as illustrated in FIG. 1A, an input 110 may be disposed near the first long side (of the chip body) of the display drive chip 1100. Although FIG. 1A illustrates the input 110 as one conductive element on the display drive chip 1100, the input 110 is not limited to such an arrangement. That is, the input 110 may include more than one row of conductive elements on the display drive chip 1100.

The input 110 may receive an electric signal from the outside and supply the electric signal to the DDI in the display drive chip 1100, according to a role of the DDI. The input 110, though, is not limited to receiving any particular type of signal (control signals and/or power signals, for example). Rather, the input may simply provide at least one row of input terminals (with the terminals of each row being discrete or contiguous) through which electrical signals may be input to the chip.

The output 120 may be disposed near the second long side of the display drive chip 1100. The output 120 may include output pins 122 for outputting an output signal from the DDI in the electric circuit region 100 located in the central part of the display drive chip 1100. Although FIG. 1A illustrates one row of the output pins 122 in the display drive chip 1100, the output 120 is not limited thereto. That is, the output pins 122 may be arranged in at least one row in the display drive chip 1100 and thus may also constitute one or more rows of output terminals of the chip.

The output 120 may output electric signals generated by the DDI in the display drive chip 1100 to an external apparatus having a display.

The input 110 and the output 120 may comprise input and output terminals, respectively, that electrically connect the display drive chip 1100 and the external apparatus to each other. Here, the term "output pin" may refer to a discrete pad or bump of conductive material or any other type of terminal at which an external device is electrically connected to the display drive chip to receive a signal output by an IC (namely, the DDI) of the display drive chip. The row or rows of terminals of the input 110 and the output 120 may be exposed by openings in the passivation layer. Thus, the exposed regions of the input 110 and output 120 may be conductive pads or bumps. Also, the input 110 and the output 120 may be formed of the same conductive material.

In examples of the display drive chip, the input 110 and/or output 120 may be metal wires that are electrically connected to the DDI and are exposed at the outside of the chip body of the display drive chip 1100. Accordingly, the display drive chip may transmit or receive electric signals directly through the exposed metal wires of the display drive chip 1100. In these examples, the display drive chip 1100 may include a plurality of openings that expose the metal wires, and the openings may be formed by etching the passivation layer. For example, the openings may be formed by a simple process of etching away portions of the passivation layer where the input 110 and the output 120 are to be disposed (that is, areas around a first long side and a second long side of a base substrate) by using a mask. However, this is an example, and the openings that expose the input 110 and output 120 are not limited to those provided by forming a passivation layer over a metal layer an then etching the passivation layer.

The ESD protection circuit unit 140 comprises an ESD protection circuit configured to protect a circuit of the chip, namely, the DDI, from ESD. The main voltage metal line 130 may electrically connect the ESD protection circuit unit 140 and the output 120 to each other in the electric circuit region 100. The auxiliary voltage metal line unit 200_1 may be disposed in a region extending around the perimeter of the electric circuit region 100 and may be connected to the ESD protection circuit unit 140. Connection metal lines 210 may electrically connect the auxiliary voltage metal line unit 200_1 and the output pins 122 to each other. However, note, the inventive concept is not limited to only auxiliary voltage metal line unit 200_1 and the number of connection metal lines 210 as illustrated in FIG. 1A.

The main voltage metal line 130 has a resistance component, and thus, line resistance exists, and line voltage drop occurs due to the line resistance. Resistance of a conductive wire is inversely proportional to the thickness of the conductive wire and is proportional to the length of the conductive wire. If the output pin 122 located at the central part of the output 120 were connected to the ESD protection circuit unit 140 only via the main voltage metal line 130, the line resistance would be relatively large. Accordingly, the output pin 122 located at the central part of the output 120 would have greater voltage drop compared to the output pin 122 that is located at an edge of the output 120. In the case of a display drive chip of the related art, an output pin located relatively far from an ESD protection circuit is protected relatively little by the ESD protection circuit due to resistance of the main voltage metal line 130 itself.

The region along the perimeter of the electric circuit region 100 may be used to prevent damage to the display drive chip 1100 and protect the electric circuit region 100 in the display drive chip 1100 when a substrate is cut to separate the substrate into chips each constituting a display drive chip 1100. That is, the substrate may be cut along lanes outside the electric circuit regions to prevent the circuit regions from being damaged by the so-called "sawing" process used to separate the substrate into dies. Also, when the display drive chip 1100 is isolated, interfaces of numerous interlayer insulation layers stacked during a device formation process may be exposed via at a side of the display drive chip 1100. Theses interfaces may form paths that allow for the intrusion of moisture and cause malfunction, destruction, etc. of the DDI of the display drive chip 1100. The region along the perimeter of the electric circuit region 100 may serve as a buffer to prevent this problem.

The auxiliary voltage metal line unit 200_1, provided in and thus using the otherwise empty region along the perimeter of the electric circuit region 100, may obviate the problem of the lack of an ESD protection effect on the output pin 122 located relatively far from the ESD protection circuit unit 140. When the auxiliary voltage metal line unit 200_1 is connected to the output pins 122 via the connection metal lines 210, the auxiliary voltage metal line unit 200_1 and the main voltage metal line 130 are connected to each other in parallel by the connection metal lines 210. Accordingly, the entire line resistance decreases, and thus, the line drop voltage may decrease. The effect of protecting the output pins 122 from ESD, and especially the pin 122 that is furthest from the ESD protection circuit unit 140, may increase.

In this regard, at least an upper part of the chip body of the display drive chip 1100 may have the shape of a quadrangle as viewed in plan, including two long sides (a first long side and a second long side) and two short sides (a first short side and a second short side), and ESD protection circuit units 140 may be respectively disposed adjacent to the short sides (the first short side and the second short side) of the electric circuit region 100. Accordingly, the output 120 of the chip is most effectively protected. However, the inventive concept is not limited to the number and arrangement of the ESD protection circuits.

Figure 1B:
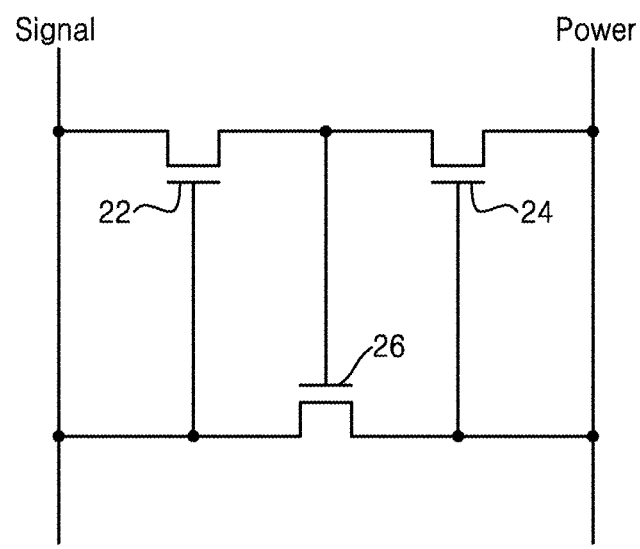
FIG. 1B is a circuit diagram of an example of an electrostatic discharge protection circuit.

FIG. 1B illustrates an example of an ESD protection circuit 20 mounted on a silicon substrate, which may be employed by a display drive chip as the ESD pretection circuit unit 140 according to the inventive concept.

Referring to FIGS. 1A and 1B, when ESD occurs in or an excessive voltage is impressed across parts of a display apparatus, the drive chip of the display apparatus is damaged, and as a result, the display apparatus may not display an image well. In order to prevent such a problem from occurring due to static electricity or excessive voltage in the display drive chip 1100 according to the inventive concept, the ESD protection circuit 20 may be provided in the drive chip 1100.

In the case in which the chip 100 is for driving the pixels of a liquid crystal display, the ESD protection circuit 20 has to prevent voltage drop or leakage current from affecting the display's operation, and when an excessive voltage due to ESD is generated in the display, the ESD protection circuit 20 has to "turn on" quickly. To this end, the ESD protection circuit 20 may include two switching TFTs 22 and 24 and one equalizer TFT 26. A first switching TFT 22 and a second switching TFT 24 may have a gate and a source connected by diode-connection to operate as a diode and may prevent current from flowing in two directions at the same time. In order to maximize operation speed of the ESD protection circuit 20, an oxide TFT in which active layers of the first switching TFT 22, the second switching TFT 24, and the equalizer TFT 26 include oxide may be used.

However, this is an example, and devices comprising a thyristor, a double-diffused MOS (DMOS) transistor, or a bipolar junction transistor may be used to configure the ESD protection circuit unit 140. In any case, the ESD protection circuit unit 140 may protect the electric circuit region 100 by dispersing the ESD when the ESD occurs. When static electricity of a high voltage occurs, the ESD protection circuit unit 140 may divert the associated current to a ground (GND) or common voltage terminal.

Figure 2:
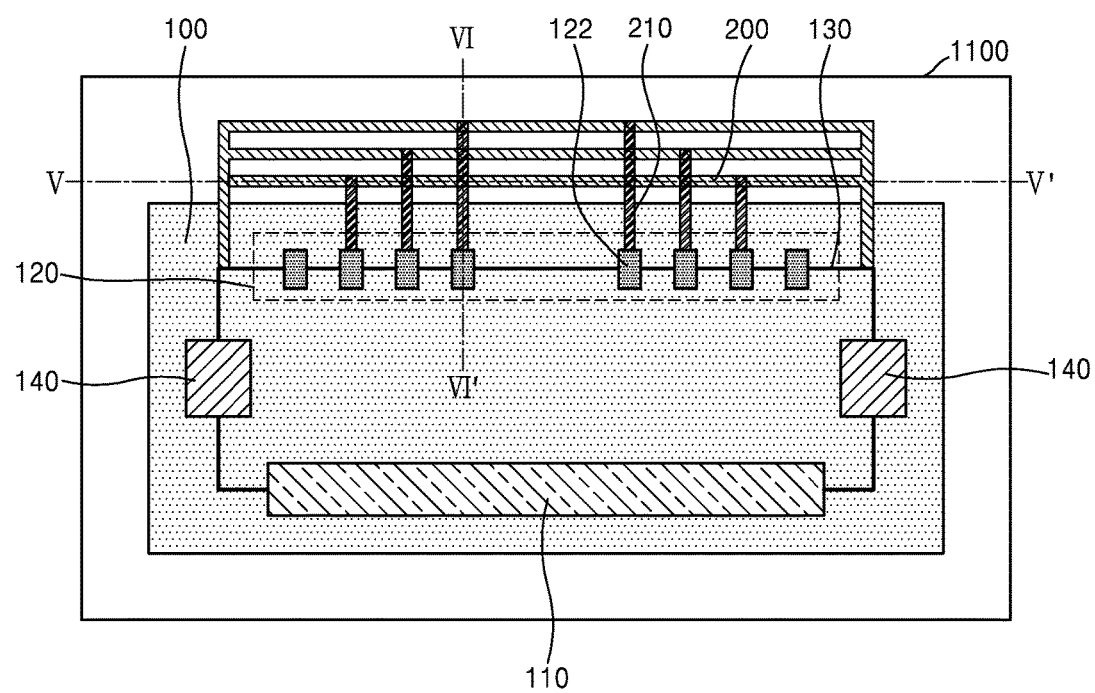
FIG. 2 is a plan view of a display drive chip including a plurality of auxiliary voltage metal lines, according to examples of the inventive concept.
Figure 3:
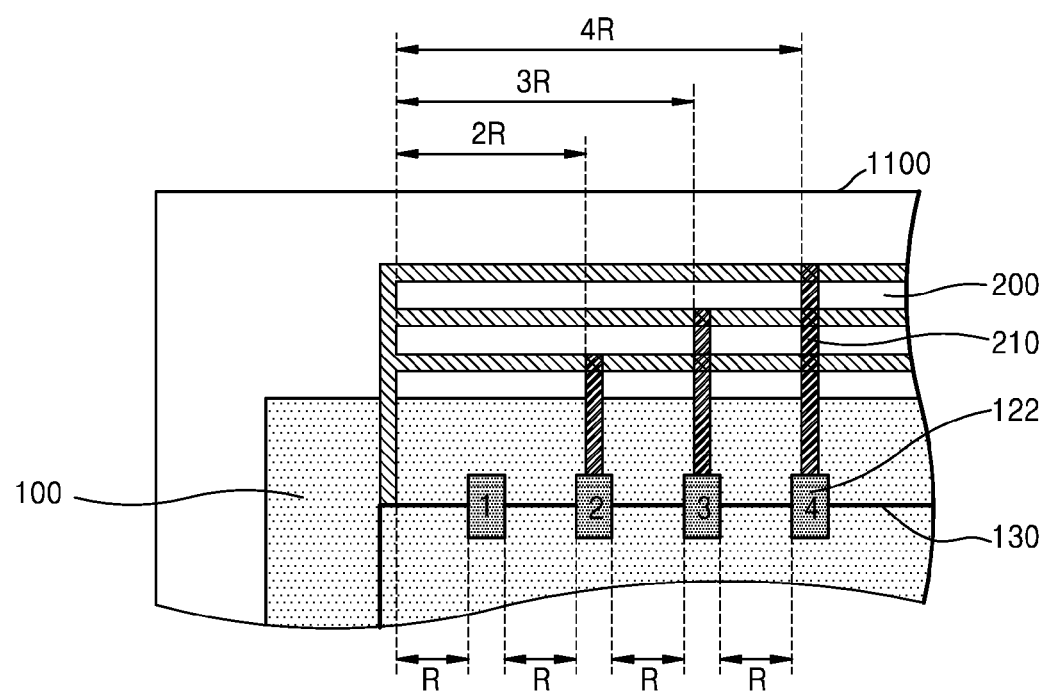
FIG. 3 is a plan view of par of a display drive chip that illustrates resistance values of an auxiliary voltage metal line and a connection metal line, according to an example of the inventive concept.

FIG. 2 is a plan view of an example of the display drive chip 1100 including a plurality of auxiliary voltage metal lines 200, according to the inventive concept. FIG. 3 is a plan view of the display drive chip 1100 that illustrates resistance values of the auxiliary voltage metal lines 200 and the connection metal lines 210, in this example of the inventive concept.

Referring to FIG. 2, the auxiliary voltage metal lines 200 may comprise a plurality of parallel metal lines disposed on same plane of a substrate (i.e., the aforementioned chip body) of the display drive chip 1100, and each of the connection metal lines 210 may connect a respective one of the output pins 122 to at least one of the auxiliary voltage metal lines 200. In this example, the closer the output pin 122 is to the central part of the output 120, the greater is the number of the auxiliary voltage metal lines 200 to which the output pin 122 is connected via a connection metal line 210.

The greater the number of the auxiliary voltage metal lines 200 connected to the output pin 122, the lower is the entire line resistance due to the parallel resistances of the lines 200, and thus, voltage drop is correspondingly low. Thus, it is ensured that the output pin 122 located at the central part of the output 120 is protected from the ESD.

Also, in this example, distances between output pins 122 may be the same as each other, and the main voltage metal line 130, the auxiliary voltage metal lines 200, and the connection metal lines 210 may be of substantially the same conductive materials (comprising a metal) and substantially the same widths and thicknesses as each other so as to have the same cross-sectional areas. Accordingly, resistivity of the main voltage metal line 130, resistivity of the auxiliary voltage metal line 200, and resistivity of the connection metal line 210 may be the same as each other, and thus, line resistance may be proportional only to line length. In this case, a calculation of a resistance value of a conductive wire connected to each output pin will be described in detail below with reference to FIG. 3.

Referring to FIG. 3, a line resistance value of the main voltage metal line 130 connected between output pin 1 and output pin 2 may be referred to as R. Line resistance value (R1) of conductive wires connected from a point at which the auxiliary voltage metal line 200 and the main voltage metal line 130 are directly connected to each other to the output pin 1, line resistance value (R2) of conductive wires connected to the output pin 2, line resistance value (R3) of conductive wires connected to output pin 3, and line resistance value (R4) of conductive wires connected to output pin 4 may be calculated. In this regard, the lengths of the connection metal line 210 illustrated in FIG. 3 are exaggerated, and actually, the connection metal lines 210 may be shorter than the auxiliary voltage metal line 200 and the main voltage metal line 130. Accordingly, the length of the connection metal lines 210 may be ignored as being negligible for purposes of the following calculation.

$$R1 = R$$

$$R2 = R, \left(\frac{1}{R2} = \frac{1}{2R} + \frac{1}{2R}\right)$$

$$R3 = R, \left(\frac{1}{R3} = \frac{1}{3R} + \frac{1}{3R} + \frac{1}{3R}\right)$$

$$R4 = R, \left(\frac{1}{R4} = \frac{1}{4R} + \frac{1}{4R} + \frac{1}{4R} + \frac{1}{4R}\right)$$

Due to parallel connection of resistances, values of R1, R2, R3, and R4 may all be similar to R. Accordingly, degrees of voltage drop from the ESD protection circuit unit 140 to each of the output pins 122 may be similar to each other. Effects of protecting each of the output pins 122 from the ESD may be similar to each other as well. However, these are rough calculations, and the values may not be exactly or even substantially the same as each other.

Furthermore, a display drive chip according to the inventive concept is not limited to having the main voltage metal line 130, the connection lines 210 and the auxiliary voltage metal lines 200 of substantially the same material (metal) and substantially the same thickness. In some examples, wires (through their material and/or thickness) having resistivity lower than that of the main voltage metal line 130 form the auxiliary voltage metal lines 200 and the connection metal line 210, to minimize the overall line resistance.

Figure 4A:
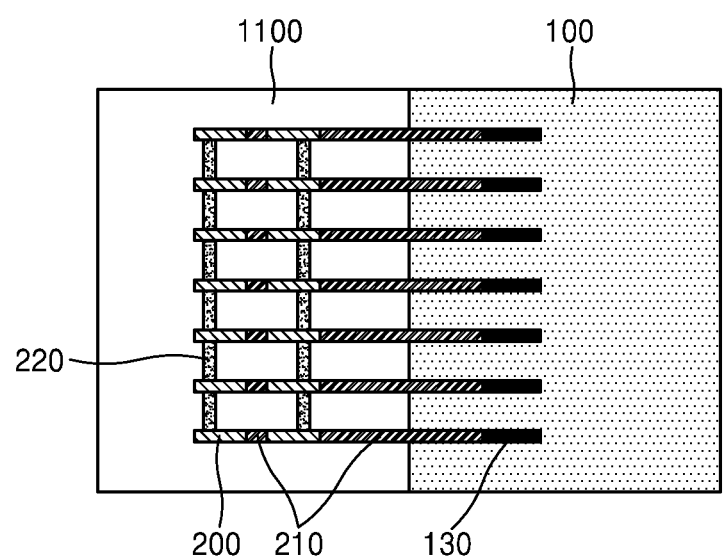
FIGS. 4A and 4B are cross-sectional views of a display drive chip according to examples of the inventive concept, each taken along line IV-IV of FIG. 1A.
Figure 4B:
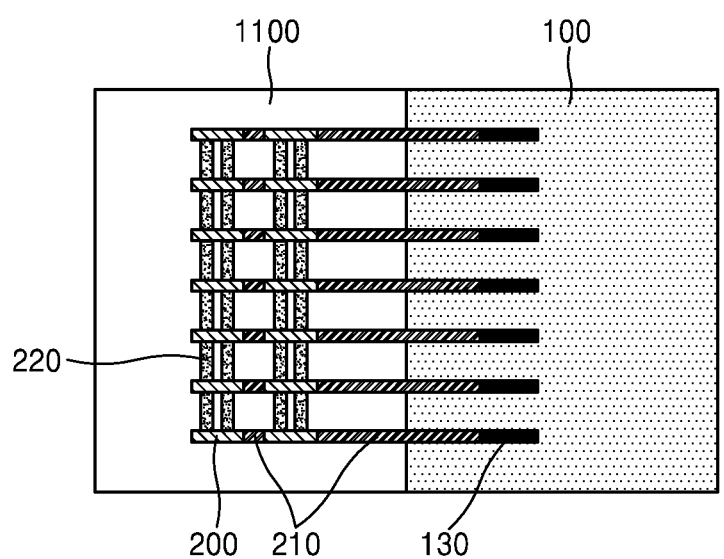
Figure 5A:
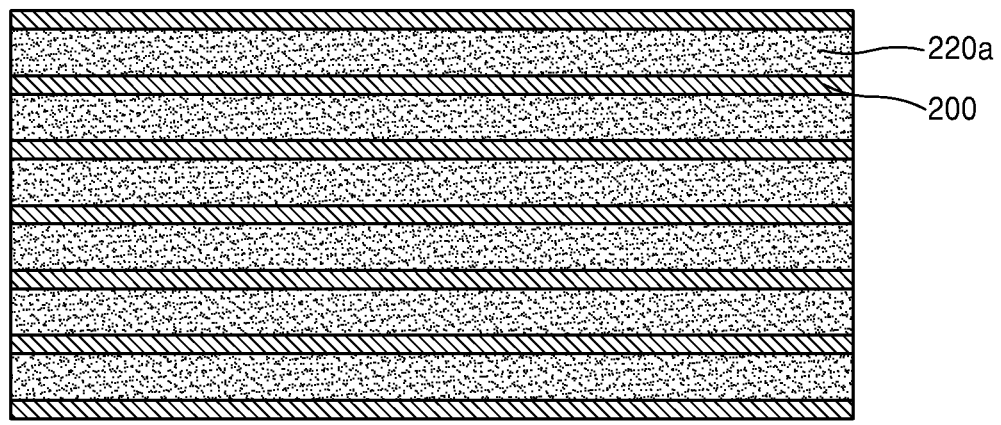
FIG. 5A is a cross-sectional view of a display drive chip according to an example of the inventive concept, taken along line V-V' of FIG. 2.
Figure 5B:
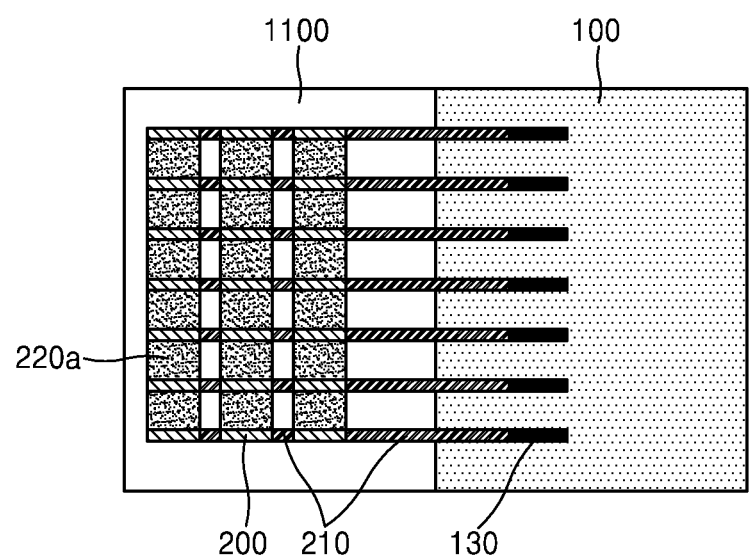
FIG. 5B is a cross-sectional view of a display drive chip according to an example of the inventive concept, taken along line VI-VI' of FIG. 2.

FIGS. 4A and 4B are cross-sectional views of the display drive chip 1100 according to an example of the inventive concept, taken along line IV-IV' of FIG. 1A. FIG. 5A is a cross-sectional view of the display drive chip 1100 according to an example of the inventive concept, taken along line V-V' of FIG. 2. FIG. 5B is a cross-sectional view of the display drive chip 1100 according to an example of the inventive concept, taken along line VI-VI' of FIG. 2. These cross-sectional views are taken through the chip body of the display drive chip, which is a multi-layered substrate in these examples formed of alternating interlayer insulating and metal (conductive) layers.

Referring to FIGS. 4A and 4B, one vertical hole-type via contact structure 220 may extend between and electrically connect each set of vertically aligned auxiliary voltage metal lines 200 located on different layers (i.e., at different levels) from each other, or two vertical hole-type via contact structures 220 may extend between each set of vertically aligned auxiliary voltage metal lines 200 located on different layers from each other.

Referring to FIGS. 5A and 5B, a line-type via contact structure 220a extends between and electrically connects each set of vertically aligned auxiliary voltage metal lines 200 located on different layers (i.e., at different levels) from each other. The line-type via contact structure 220a may be composed of lines of conductive material running parallel (horizontally) to the auxiliary voltage metal lines 200 along the auxiliary voltage metal lines 200.

That is, respective ones of the auxiliary voltage metal lines 200 may be stacked on each other, and there may be at least one via in each gap between vertically adjacent ones of the auxiliary voltage metal lines 200. The via may be of a hole type or line type (a cylindrical electrically conductive member whose central longitudinal axis extends vertically or a linear electrically conductive member whose horizontal axis extends horizontally). However, the via contact structure 200 constituted by the vias is not limited to any particular type of via.

Figure 6A:
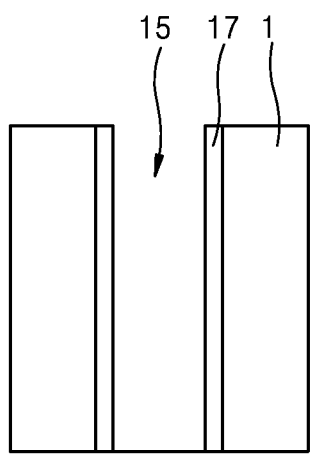
FIGS. 6A and 6B are cross-sectional views of part of a semiconductor devices during the course of its manufacture and illustrate a processes of forming a via contact of the semiconductor device, which may be employed by a display drive chip according to the inventive concept.
Figure 6B:
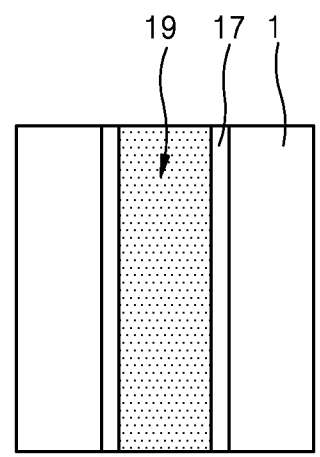

FIGS. 6A and 6B are cross-sectional views of a process of forming a via 19 of a semiconductor device and used as the aforementioned vias.

Referring to FIG. 6A, a via contact hole 15 may be formed by etching a semiconductor substrate 1 to a certain depth. Next, an insulation layer 17 may be formed on an inner wall of the via contact hole 15. In this regard, the insulation layer 17 may include a material that includes an oxide film.

Referring to FIG. 6B, a metal seed layer may be formed at the bottom of the via contact hole 15 lined by the insulation layer 17. Next, a metal layer may be buried in the via contact hole 15 by growing the metal seed layer to form the via 19. In this regard, the metal layer may include copper (Cu). The via 19 may be a through-silicon-via.

Figure 7:
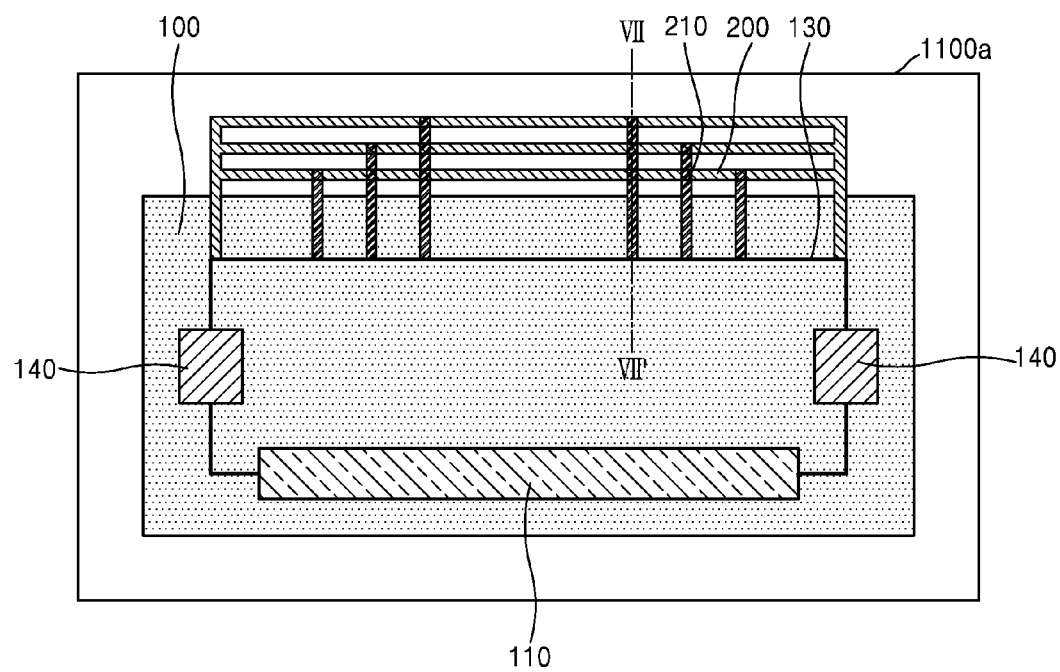
FIGS. 7 and 8 are plan views of a display drive chip according examples of the inventive concept.
Figure 8:
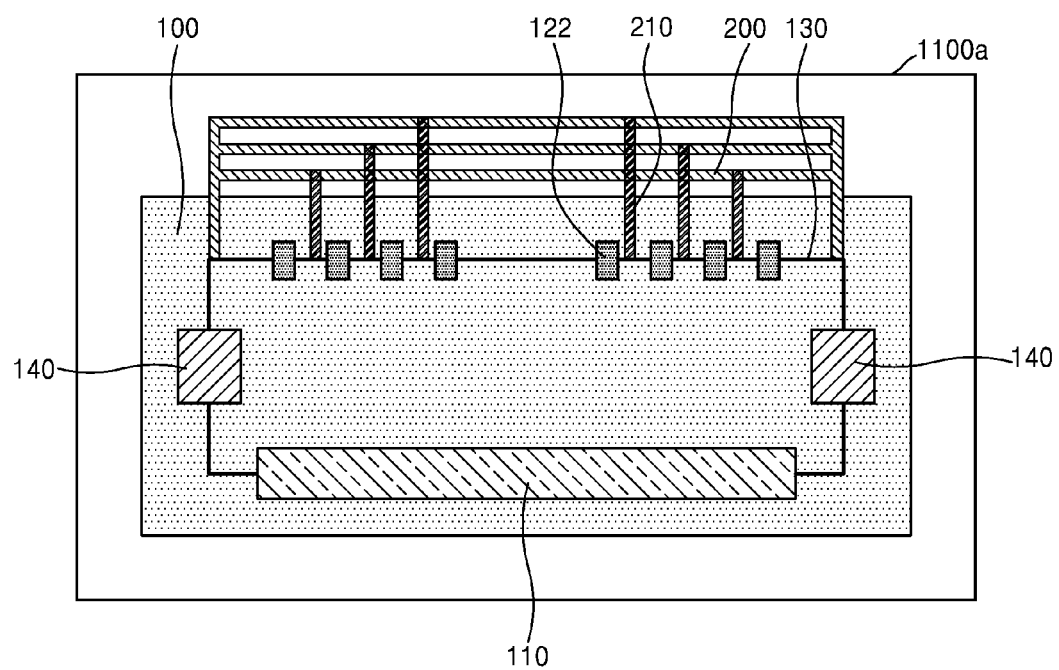

FIGS. 7 and 8 are plan views of a display drive chip 1100a according to examples of the inventive concept.

Referring to FIG. 7, the display drive chip 1100a may include the ESD protection circuit unit 140 for protecting a circuit from the ESD, the main voltage metal line 130 electrically connected to the ESD protection circuit unit 140 in the electric circuit region 100 located in the central part of the display drive chip 1100a, at least one auxiliary voltage metal line 200 connected to the ESD protection circuit unit 140 and disposed in the region at the perimeter of the electric circuit region 100 of the display drive chip 1100a, and the connection metal lines 210 for connecting the auxiliary voltage metal line(s) 200 and the main voltage metal line 130 to each other.

The auxiliary voltage metal line(s) 200 may obviate the problem of the related art by being provided in the region at the perimeter of the electric circuit region 100. When each auxiliary voltage metal line 200 is connected to the main voltage metal line 130 via connection metal lines 210, the auxiliary voltage metal line(s) 200 and the main voltage metal line 130 are connected to each other in parallel.

Referring to FIG. 8, the display drive chip 1100a may further include output pins 122 for outputting signals from a circuit of the chip, namely, the DDI, and the main voltage metal line 130 may electrically connect the ESD protection circuit unit 140 and the output pins 122 to each other. In the illustrated example, a plurality of the auxiliary voltage metal lines 200 comprises a plurality of parallel metal lines disposed on same plane of a substrate of the display drive chip 1100a, and each connection metal line 210 connects the main voltage metal line 130 and at least one of the auxiliary voltage metal lines 200 to each other. In this example, the connection metal lines 210 are directly connected to the main voltage metal line 130 instead of through the intermediary of the output pins 122.

Regardless, because the main voltage metal line 130 and the auxiliary voltage metal line(s) 200 are electrically connected to one another in parallel, the overall line resistance is minimized, and thus, line voltage drop is minimized. Accordingly, the output pins 122 are all effectively prevented by the ESD circuit unit 140 from being damaged by ESD.

This example also has the same features and advantage in terms of line resistances as described above with reference to FIGS. 2 and 3. Briefly, in this example the voltage drops between the ESD protection circuit unit 140 and each portion of the main voltage metal line 130 to which an output pin 122 is connected may be similar. Thus, the output pins 122 including that furthest from the ESD protection circuit 140 and hence, the electric circuit region 100, may be protected from ESD.

Figure 9:
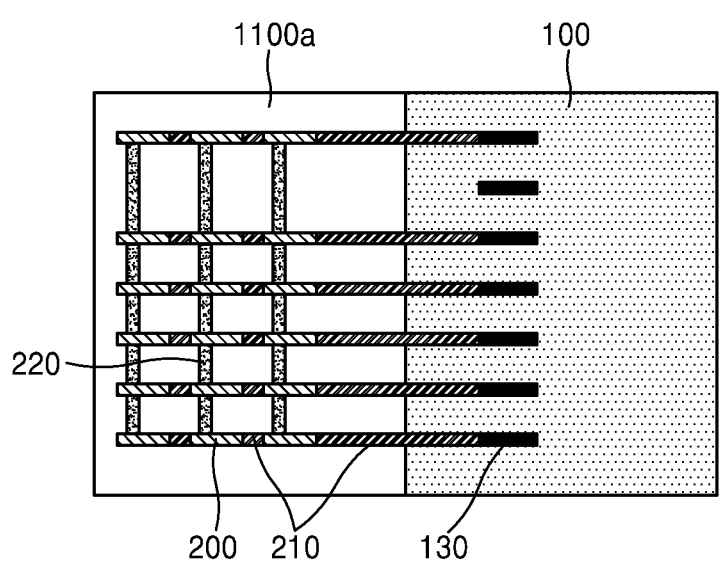
FIG. 9 is a cross-sectional view of a display drive chip according to an example of the inventive concept, taken along line VII-VII' of FIG. 7.

FIG. 9 is a cross-sectional view of the display drive chip 1100a according to an example of the inventive concept, taken along line VII-VII' of FIG. 7.

Referring to FIG. 9, the auxiliary voltage metal lines 200 may be disposed on a plurality of interlayer insulating layers of the substrate or chip body of the display drive chip 1100a stacked on each other, i.e., one or more stacks of voltage metal lines 200 may be provided. Some of the layers of the substrate or chip body may be devoid of the auxiliary voltage metal lines 200. At least one via contact structure 220 may extend between the different layers of auxiliary voltage metal lines 200 to electrically connect the layers. That is, an auxiliary voltage metal line 200 does not have to be present in all of the layers, and even when the auxiliary voltage metal lines 200 are present in only some of the layers, the electric circuit region 100 is better protected from the ESD compared to the related art.

Figure 10A:
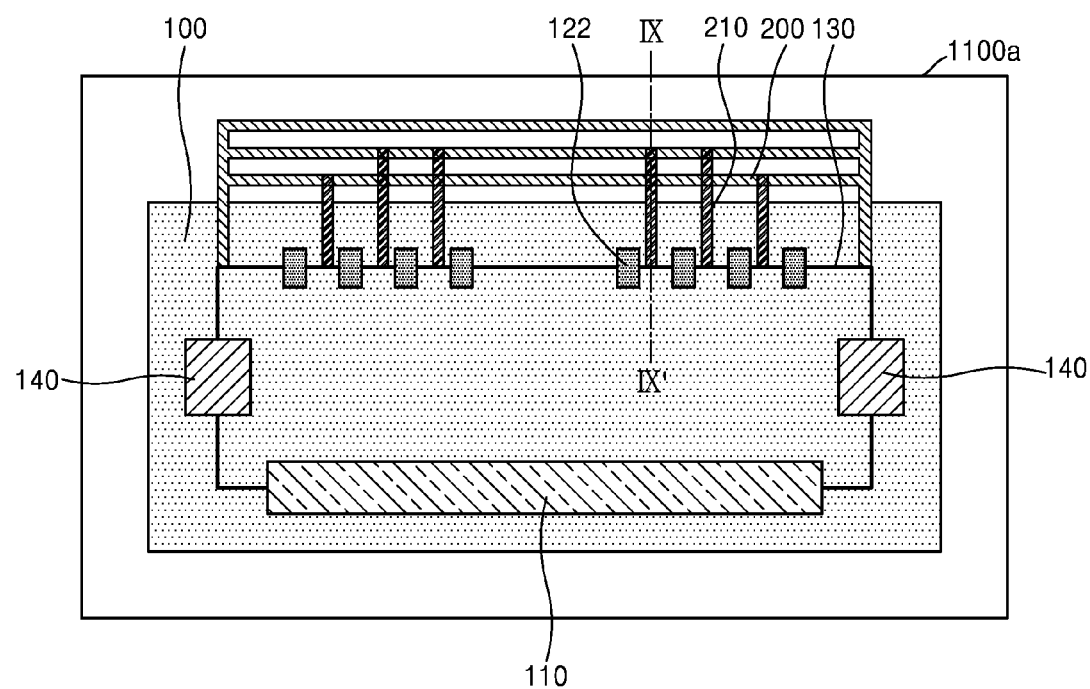
FIG. 10A is a plan view of a display drive chip according to an example of the inventive concept.
Figure 10B:
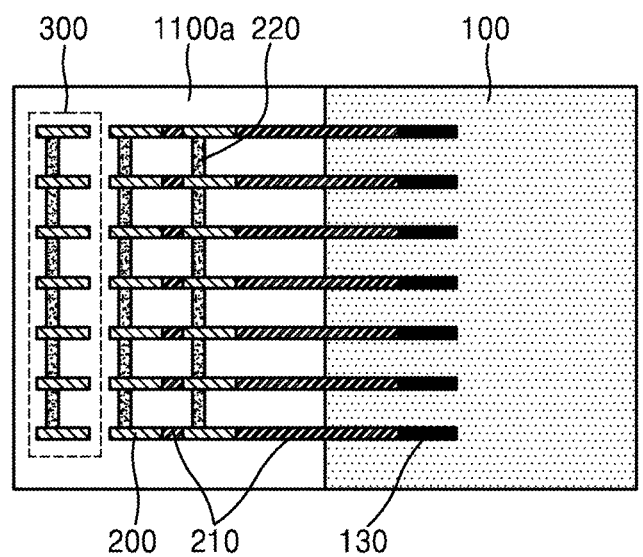
FIG. 10B is a cross-sectional view of a display drive chip according to an example of the inventive concept, taken along line IX-IX' of FIG. 10A.

FIG. 10A is a plan view of the display drive chip 1100a according to another example of the inventive concept. FIG. 10B is a cross-sectional view of the display drive chip 1100a, taken along line IX-IX' of FIG. 10A.

Referring to FIGS. 10A and 10B, the connection metal lines 210 are not be electrically connected to a stack of the auxiliary voltage metal lines 200 that is located furthest from the electric circuit region 100 of the display drive chip 1100a. The auxiliary voltage metal lines 200 of this stack may be electrically connected by a via contact structure to form an isolated auxiliary voltage metal line stack structure 300. When a substrate is sawed to separate the display drive chip 1100a from one another, the isolated auxiliary voltage metal line stack structure 300 may prevent the other (inner) auxiliary voltage metal lines 200 from being damaged and protect the electric circuitry of the electric circuit region 100. That is, the isolated auxiliary voltage metal line stack structure 300 may prevent moisture from penetrating into the chip along paths which, as was described above, are present along interfaces of the various interlayer insulating layers of the chip exposed at the side of the chip by the "sawing" process. Accordingly, the isolated auxiliary voltage metal line stack structure 300 can prevent the display drive chip 1100a from malfunctioning or being ruined, etc.

Figure 11:
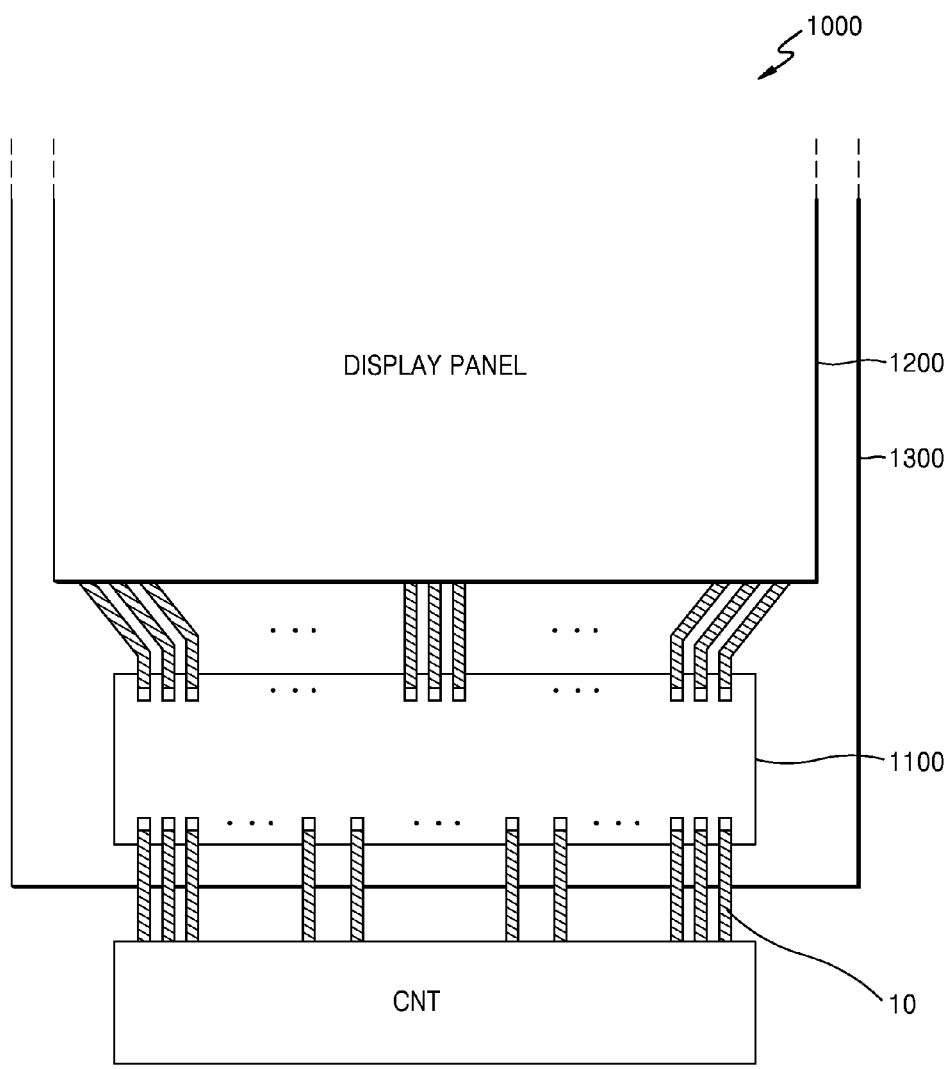
FIG. 11 is a schematic diagram of a display drive chip mounted on a glass substrate according to an example of the inventive concept.

FIG. 11 illustrates a display apparatus 1000 of a chip on glass (COG) type, according to an example of the inventive concept.

Referring to FIG. 11, the display apparatus 1000 may include a display panel 1200 containing an array of pixels, the display drive chip 1100, and a glass substrate 1300.

The display panel 1200 receives a drive signal from the display drive chip 1100 and outputs an image. The display panel 1200 may be a liquid crystal display (LCD) panel or a light-emitting diode (LED) panel. However, the display panel 1200 of the apparatus 1000 according to the inventive concept is not limited to either of these types of display panels.

The display drive chip 1100 can be any of the display drive chips described with reference to FIG. 1A, FIGS. 2 to 5B, and FIGS. 7 to 10B. The display drive chip 1100 may receive an input signal and an image signal from the outside (a controller CNT) via an input located at its bottom (in the orientation shown in FIG. 11), generate a drive signal based on the input signal and the image signal, and output the drive signal to the display panel 1200 via an output pins located at its top. The display drive chip 1100 may be mounted on the glass substrate 1300. A type of display in which the display drive chip and the display panel are mounted on a glass substrate is referred to as the COG type of display.

In the COG-type of display apparatus 1000, the input of the display drive chip 1100 comprises a row of conductive pads and the output comprise a row of conductive pads of the display drive chip 1100. The display panel 1200 may be electrically connected to the pads of the output via wiring 10 disposed on the glass substrate 1300. In this regard, the wiring 10 disposed on the glass substrate 1300 may comprise wires or electrodes that are of transparent material such as indium tin oxide (ITO).

Figure 12:
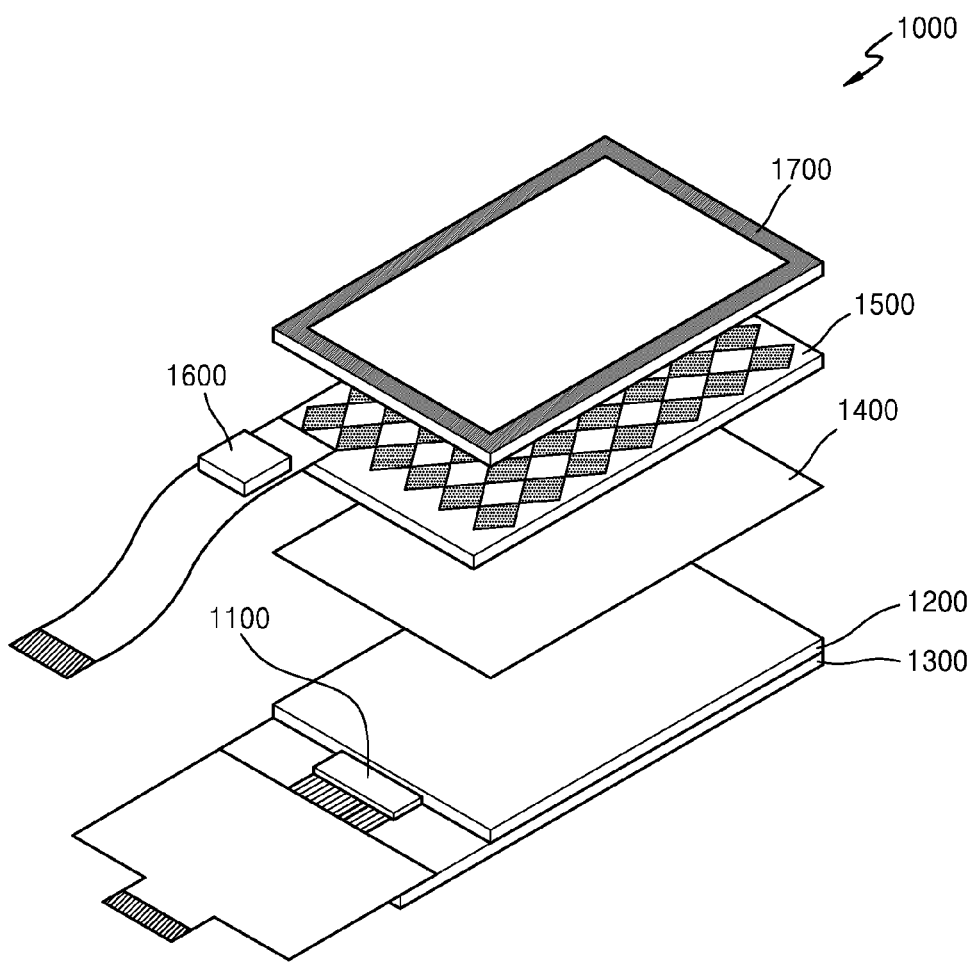
FIG. 12 is an exploded perspective view of a structure of a display apparatus according to an example of the inventive concept.

FIG. 12 illustrates a more specific example of the display apparatus 1000 according to the inventive concept.

The display apparatus 1000 may include the glass substrate 1300, the display drive chip 1100, the display panel 1200, a polarizing plate 1400, and a window 1700.

In general, materials such as acrylic or reinforced glass are used to manufacture the window 1700, and thus, the window 1700 may protect a module from external shock or scratches due to repetitive touching. The polarizing plate 1400 may be provided to improve optical characteristics of the display panel 1200.

The display panel 1200 may be formed by patterning a transparent electrode on the glass substrate 1300. The display panel 1200 may include a plurality of pixels for displaying an image frame(s). According to an example of the inventive concept, the display panel 1200 may be a liquid crystal panel. However, the display panel 1200 is not limited thereto and may include various types of display devices. For example, the display panel 1200 may be an organic light-emitting diode (OLED) display, an electrochromic display (ECD), a digital mirror device (DMD), an actuated mirror device (AMD), a grating light valve (GLV) device, a plasma display panel (PDP), an electro luminescent display (ELD), an LED display, or a vacuum fluorescent display (VFD).

The display drive chip 1100 may be mounted on the glass substrate 1300 in a COG manner. However, this is just one example of the inventive concept, and the display drive chip 1100 may be mounted in various other ways such as chip on film (COF) or chip on board (COB). The display drive chip 1100 can be any of the display drive chips described with reference to FIG. 1A, FIGS. 2 to 5B, and FIGS. 7 to 10B according to the inventive concept. Accordingly, the display drive chip 1100 and the display panel 1200 may be electrically connected to each other via ITO wiring disposed on the glass substrate 1300.

Recently, touchscreen products have been widely used in various fields and have rapidly replaced button-type devices due to their spatial advantages. The most explosive demand for touchscreen products is in the field of cellular phones, led by smartphones. Commercially important aspects of cellular phones are not only their convenience but also their size and thus, touch phone types that provide no separate keys or have minimized keys have become widely popular. Accordingly, the display apparatus 1000 may further include a touch panel 1500 and a touch controller 1600. The touch panel 1500 is formed patterning a transparent electrode on a glass substrate, polyethylene terephthalate (PET) film, or the like. The touch controller 1600 may sense the touching of the touch panel 1500, calculate coordinates of the location where the panel 1500 has been touched, etc., and transmit the same to a host. The touch controller 1600 may be integrated with the display drive chip 1100 or may be part of its own dedicated semiconductor chip.

Although the inventive concept has been particularly shown and described with reference to examples thereof, it will be understood that various changes in form and details may be made to the examples without departing from the spirit of the inventive concept and scope of the following claims.

What is claimed is:
1. A display drive chip comprising:
at least one electrostatic discharge (ESD) protection circuit;
an integrated circuit disposed in an electric circuit region located in a central part of the display drive chip;
an output comprising output pins at which signals from the integrated circuit are output;
a main voltage metal line electrically connecting the ESD protection circuit and the output pins to each other in the electric circuit region such that the output pins are electrically connected to the ESD protection circuit;
at least one auxiliary voltage metal line that is electrically connected to the ESD protection circuit and disposed in a region of the display drive chip outside the perimeter of the electric circuit region; and
connection metal lines connecting the at least one auxiliary voltage metal line and the output pins to each other.

2. The display drive chip of claim 1, wherein the at least one auxiliary voltage metal line comprises a plurality of parallel metal lines disposed on same plane of a substrate of the display drive chip.

3. The display drive chip of claim 2, wherein the electric circuit region has two long sides of substantially equal lengths and two short sides of substantially equal lengths less than those of the long sides, the at least one ESD protection circuit comprises ESD protection circuits adjacent to the two short sides of the electric circuit region, respectively, the main voltage metal line is electrically connected to the ESD protection circuits at ends of the main voltage metal line, respectively, and the output pins are disposed along the main voltage metal line.

4. The display drive chip of claim 3, wherein the output pins include one output pin closest among the pins to a central part of the main voltage metal line, and other output pins disposed between said one output pin and respective ends of the main voltage metal line at which the main voltage metal line is electrically connected to the ESD protection circuits, respectively, each of said one and the other output pins is directly electrically connected to at least one of the auxiliary voltage metal lines by a respective one of the connection metal lines, and the number of the auxiliary voltage metal lines directly electrically connected to said one of the output pins by a said respective one of the connection metal line is greater than the number of the auxiliary voltage metal lines directly electrically connected to each said other of the output pins by a respective one of the connection metal lines.

5. The display drive chip of claim 2, wherein the at least one auxiliary voltage metal line comprises respective stacks of the auxiliary voltage metal lines, the auxiliary voltage metal lines in each of the stacks being vertically aligned and disposed at different levels in the chip, and further comprising at least one conductive via extending vertically between and electrically connecting adjacent ones of the auxiliary voltage metal lines in each of the stacks.

6. The display drive chip of claim 5, wherein each said at least one via comprises a cylindrical electrically conductive member whose central longitudinal axis extends vertically or a linear electrically conductive member whose horizontal axis extends horizontally.

7. A display drive chip comprising:
at least one ESD protection circuit;
a main voltage metal line that is electrically connected to the ESD protection circuit in an electric circuit region located in a central part of the display drive chip;
at least one auxiliary voltage metal line electrically connected to the ESD protection circuit and disposed in a region extending around the perimeter of the electric circuit region; and
connection metal lines electrically connecting the auxiliary voltage metal line and the main voltage metal line to each other.

8. The display drive chip of claim 7, further comprising an output pin through which a signal is output from the chip, and
wherein the main voltage metal line electrically connects the ESD protection circuit and the output pin to each other.

9. The display drive chip of claim 8, wherein the at least one auxiliary voltage metal line comprises a plurality of auxiliary voltage metal lines adjacent to an upper surface of a body of the chip, and each of the connection metal lines connects the main voltage metal line directly to at least one of the auxiliary voltage metal lines.

10. The display drive chip of claim 9, wherein the connection metal lines include one connection metal line connected to the main voltage metal line at a first location, and at least one other connection metal line connected to the main voltage metal line at a respective location that is closer to the ESD protection circuit along the main voltage metal line than the first location, and
each said at least one other connection metal line connects the main voltage metal line directly to a greater number of the auxiliary voltage metal lines than said one connection metal line.

11. The display drive chip of claim 10, wherein the main voltage metal line and each said at least one auxiliary voltage metal line comprise substantially the same materials and have substantially the same cross-sectional areas.

12. The display drive chip of claim 8, wherein the at least one auxiliary voltage metal line comprises a stack of auxiliary voltage metal lines respectively disposed at different levels in the chip.

13. The display drive chip of claim 12, further comprising electrically conductive vias extending between and electrically connecting vertically adjacent ones of the auxiliary voltage metal lines of the stack.

14. The display drive chip of claim 13, further comprising a multi-layered chip body of interlayer insulating layers, the auxiliary voltage metal lines of the stack being disposed on only some of the interlayer insulating layers, respectively.

15. The display drive chip of claim 8, wherein the at least one auxiliary voltage metal line comprises stacks of auxiliary voltage metal lines disposed at different distances from the electric circuit region of the chip, the stacks of auxiliary voltage metal lines in each of the stacks being vertically aligned and disposed at different levels from one another in the chip, and none of the connection metal lines that are connected to the main voltage metal line are electrically connected to the stack of the auxiliary voltage metal lines that is furthest from the electric circuit region of the chip.

16. A display drive chip comprising:
a body having a central electric circuit region and a peripheral region extending around the perimeter of the central electric circuit region;
a display driver integrated circuit (DDI) confined to the central electric circuit region of the body of the chip;
electrostatic discharge (ESD) circuitry comprising an ESD protection circuit disposed in the central electric circuit region of the body of the chip;
a main voltage metal line that is electrically connected to the ESD protection circuit in the central electric circuit region, and to the display driver circuit (DDI);
at least one auxiliary voltage metal line that is confined to the peripheral region of the body of the chip and is electrically connected to the ESD protection circuit; and
a series of connection metal lines running between and electrically connecting the main voltage metal line and the at least one auxiliary voltage metal line to each other.

17. The display drive chip of claim 16, wherein the main voltage metal line extends parallel to each said at least one auxiliary metal voltage line, and
further comprising output terminals disposed in a row parallel to each said at least one auxiliary voltage metal line and through which signals from the display driver circuit (DDI) are output from the chip, each of the output terminals being electrically connected to the ESD protection circuit by the main voltage metal line and exposed to the outside of the chip.

18. The display drive chip of claim 16, wherein the at least one auxiliary metal line comprises a plurality of auxiliary metal lines each extending parallel to the main voltage metal line, each of the metal connection lines electrically connects the main voltage metal line directly to at least one of the auxiliary metal lines, the connection metal lines include one connection metal line that is electrically connected to the main voltage metal line at a first location, and at least one other connection metal line that is electrically connected to the main voltage metal line at a respective location that is closer to the ESD protection circuit along the main voltage metal line than the first location, and each said at least one other connection metal line electrically connects the main voltage metal line directly to a greater number of the auxiliary metal lines than said one connection metal line.

19. The display drive chip of claim 18, wherein the plurality of auxiliary voltage metal line comprises respective stacks of the auxiliary voltage metal lines, the auxiliary voltage metal lines in each of the stacks being vertically aligned and disposed at different levels in the chip, and further comprising at least one conductive via extending vertically between and electrically connecting adjacent ones of the auxiliary voltage metal lines in each of the stacks.

20. The display drive chip of claim 18, further comprising an input providing a row of input terminals exposed to the outside of the chip, electrically connected to the display driver circuit (DDI) and through which signals are input from an external device to the display driver circuit (DDI), and wherein the central electric circuit region has two opposite long sides of substantially equal lengths and two opposite short sides of substantially equal lengths shorter than those of the long sides, the row of input terminals is disposed within the central electric circuit region adjacent and parallel to one of the long sides of the central electric circuit region, the main voltage metal line is disposed within the central electric circuit region and is disposed adjacent to and extends parallel to the other of the long sides of the central electric circuit region, the ESD protection circuitry includes two ESD protection circuits disposed in the central electric circuit region adjacent to the short sides of the central electric circuit region, respectively, one of the ESD protection circuits is electrically connected to the input at one end of the row of input terminals and to the main voltage metal line at one end of the main voltage metal line, and the other of the ESD protection circuits is electrically connected to the input at the other end of the row of input terminals and to the main voltage metal line at the other end of the main voltage metal line.

\* \* \* \* \*